United States Patent Office 3,801,550
Patented Apr. 2, 1974

3,801,550
INTERPOLYMERS OF VINYL FLUORIDE, VINYL ESTERS AND UNSATURATED CARBOXYLIC ACIDS
Robert Leonard Adelman, Wilmington, Del., assignor to E. I. du Pont de Nemours and Company, Wilmington, Del.
No Drawing. Continuation-in-part of abandoned application Ser. No. 166,624, July 27, 1971. This application Aug. 9, 1972, Ser. No. 279,272
Int. Cl. C08f 15/40
U.S. Cl. 260—78.5 R         21 Claims

ABSTRACT OF THE DISCLOSURE

Interpolymers containing about 10 to 83% vinyl fluoride, about 17 to 90% vinyl ester, and about 0.1 to 12% of a polymerizable, olefinically unsaturated carboxylic acid having an acidity constant (pKa) of from about 1 to about 5.5, the total vinyl fluoride-vinyl ester content being at least about 78%, are described. An internally plasticizing monomer also may be incorporated in amounts from 0 to 22% of the terpolymer. These interpolymers are soluble or dispersible in common organic solvents to provide easily applied surface coatings or paints having good weatherability; impact strength; toughness; chemical, abrasion and print resistance; unexpectedly good wet adhesion to wood and phosphatized steel; superior gloss and electrical properties; and which can be highly pigmented without adversely affecting their thermal stability. A method for making the new polymers is also described.

CROSS-REFERENCE

This is a continuation-in-part of my earlier copending U.S. patent application Ser. No. 166,624, filed July 27, 1971 now abandoned.

BACKGROUND OF THE INVENTION

The homopolymer of vinyl fluoride is characterized by excellent strength, toughness, chemical resistance, and weatherability, and is commercially available in film form. Such vinyl fluoride homopolymer film is useful for both decorative and protective purposes and is applicable to a wide variety of substrates by means of adhesives. The adhesives are necessary because polyvinyl fluoride film has poor adhesion per se, not only for metals such as aluminum and steel, but for cellulosic materials, such as wood and hardboard; cement-asbestos board, and for many plastics as well. Moreover, polyvinyl fluoride can neither be applied as a hot melt, nor extruded onto a substrate because of its poor flow properties and limited thermal stability at its temperature of flow. Furthermore, polyvinyl fluoride is insoluble in the readily available, inexpensive organic solvents commonly used in the coatings industry, and, therefore, cannot be applied economically either as a solution (lacquer), or in the form of an organosol. While aqueous dispersions of polyvinyl fluoride have been prepared, such solutions are not suitable for the preparation of air-dried finishes or baked finishes at low to moderate temperatures, since higher temperatures are required to obtain acceptable film coalescence. Although expensive, high-boiling solvents such as dimethyl formamide, dimethyl sulfoxide, and hexamethyl phosphoramide, are effective in swelling polyvinyl fluoride and may be added to aqueous dispersions to aid coalescence, when this is done, high bake temperatures and extended drying times are required to remove the solvent from the drying film. It is apparent, therefore, that while the strength, toughness, chemical resistance, and weatherability of polyvinyl fluoride would make it a highly desirable surface coating, it has not come into widespread use for this purpose, since it has not previously been possible to apply it to substrates in a convenient and economical manner. Another disadvantage of polyvinyl fluoride surface coatings previously available has been that it has not been possible to incorporate high levels of pigment in such materials without adversely affecting the thermal stability of the coatings.

It is, therefore, a primary object of this invention to improve the applicability of polyvinyl fluoride as a protective coating, while retaining or even improving its excellent surface properties, chemical resistance and weatherability.

It is another object of the invention to provide new compositions containing polyvinyl fluoride polymer and having the desirable properties of that material, but which can be applied to a wide variety of substrates in a convenient and economical manner.

It is another object to provide polyvinyl fluoride surface coatings in which large amounts of pigment can be incorporated without adversely affecting the stability of the coatings against thermal degradation.

It is another object of this invention to provide polyvinyl fluoride surface coatings having good gloss and gloss retention.

It is still another object of this invention to provide polyvinyl fluoride surface coatings having desirable electrical properties such as low dissipation factor and high volume resistivity.

It is yet another object of the invention to provide a family of polyvinyl fluoride surface coatings in which the important properties vary over a desirable range for each, and in which the different coatings each possess a desirable spectrum of the different properties.

PRIOR ART

Sapper, in U.S. Pat. 2,917,402, has stated that copolymers of vinyl fluoride and vinyl esters of saturated aliphatic monocarboxylic acids, such as acetic acid, in film form and as coatings are transparent, substantially colorless, flexible and tough, exceptionally light-stable, and strongly adherent to polyethylene surfaces. The Sapper patent discloses that laminates of polyethylene with vinyl fluoride/vinyl ester copolymers have better weatherability than polyethylene itself, at least when the laminates contain ultraviolet light screeners. Sapper does not, however, suggest either the equivalence or superiority of the vinyl fluoride/vinyl acetate copolymers over other polymers noted for good weatherability characteristics, such as polyvinyl fluoride alone, or methacrylate/vinyl fluoride copolymers, for example.

Straughan et al. in U.S. Pat. 3,057,812 discloses vinyl fluoride/ethylacrylate (optional acrylonitrile)/acrylic acid quadripolymers (Example 45) and vinyl fluoride/ethyl acrylate/(optional N,N-diethylacrylamide)/acrylic acid quadripolymers (Example 36). The alkyl acrylate is said to be used to impart flexibility to the polymers (column 4, lines 3–6). The polymers of this patent have a second order transition temperature between 45° C. and 125° C. (column 2, line 43).

Tetrapolymers of vinyl fluoride, vinyl, vinyl esters, an ethylenically unsaturated carboxylic acid having an acidity constant (pKa) of from 1 to 5.5, and tetrafluoroethylene are described in U.S. Pat. 3,531,441 to F.B. Stilmar. In this case, the expensive monomer, tetrafluoroethylene, is an essential component, with the objective of attaining enhanced thermal stability above 200° C.

Vinyl fluoride/vinyl acetate copolymers and the corresponding ethylene terpolymers have long been known in the art and a method for their preparation is described in U.S. Pat. 2,419,009.

SUMMARY OF THE INVENTION

It has now been discovered that the foregoing and other objects of the present invention can be achieved by the preparation of a family of new vinyl fluoride/vinyl ester/polymerizable olefinically unsaturated carboxylic acid interpolymers, and such polymers internally plasticized with certain higher vinyl esters, acrylic esters, methacrylic esters or ethylene. All of the new polymers are capable of being formulated into surface coatings or paints by the use of conventional vehicles to provide easily applicable and highly weatherable protective coatings for a variety of substrates including iron, steel, aluminum, cellulosics and plastics, among others. In its broader aspects the invention includes interpolymers consisting essentially of about 10 to 83% vinyl fluoride, about 17 to 90% vinyl ester, about 0 to 22% internal plasticizer, and about 0.1 to 12% of a polymerizable, olefinically unsaturated acid having an acidity constant (pKa) of from about 1 to 5.5, all by weight of the terploymer. In the new compositions it is essential that there be a substantial content of the vinyl ester, of the order of about 17% or more, as noted above and that the total content of vinyl fluoride and vinyl ester be at least about 78%, as will be explained hereinafter. Internal plasticizers are optional but desirable and are used in amounts of from about 0 to 22% by weight of the terpolymer. The term "consisting essentially of," as used herein, is intended to include only those unspecified ingredients or impurities which do not materially alter or detract from the basic and novel charactertistics of this invention. In other words, this term excludes unspecified ingredients or impurities in amounts which prevent the advantages of this invention from being realized.

The novel polymers of the present invention may be divided into two distinct types on the basis of their properties and content of vinyl fluoride (VF). For ease of description herein these two types will be referred to hereinafter as low VF and high VF interpolymers. All of the new interpolymers are capable of being formulated into surface coating compositions applicable by conventional methods at or near ambient temperatures to provide protective coatings, have good strength, toughness, chemical resistance and weatherability and which can be pigmented without adversely affecting their thermal stability.

The low VF interpolymers contain from about 10 up to about 59% vinyl fluoride, about 30 to about 90% vinyl ester and about 0.1 to 12% of a polymerizable, olefinically unsaturated carboxylic acid having an acidity constant (pKa) of from about 1 to 5.5, all based on the weight of the terpolymer. An internally plasticizing monomer such as ethylene or an acrylic ester, for example, may be incorporated in amounts from about 0 to 22% of the terpolymer. These low VF interpolymers, in addition to the properties common to the entire family of interpolymers of the present invention, when formulated into surface coatings, applied to a substrate and dried by conventional methods, exhibit especially good wet adhesion to wood or phosphatized steel, i.e., the finished protective coatings resist damage by moisture or immersion in water. These low VF interpolymers also exhibit especially good gloss and gloss-retention. Most unexpectedly, however, the low VF interpolymers have excellent electrical properties such as low dissipation factor and high volume resistivity.

The high VF interpolymer compositions comprise about 60–83% of vinyl fluoride, about 0.1–12.0% of polymerizable, olefinically unsaturated acid having an acidity constant (pKa) of from about 1 to 5.5, and about 17–40% of vinyl ester, all by weight of the terpolymer. The internal plasticizers are incorporated in amounts of about 0–22% based on the weight of the terpolymer; for example, in a polymer of the invention containing 60% vinyl fluoride, 20% vinyl acetate and 2% methacrylic acid, 18% ethylene may suitably be employed as an internal plasticizer, all based on the weight of the total composition. These high VF interpolymers differ from the low VF interpolymers, when used in surface coating compositions, in exhibiting lower gloss. They also differ in electrical properties in that they do not have as high volume resistivity and low dissipation factor as the low VF interpolymers. The most important difference, however, is that the high VF interpolymers provide protective coatings with outstanding properties including: resistance to accelerated weathering, as observed in the Atlas XW Weatherometer (with either the carbon or xenon arc); impact strength; toughness (elongation at break); and water, solvent, alkali, abrasion and print resistance.

DETAILED DESCRIPTION OF THE INVENTION

High VF interpolymers

As noted above the high VF terpolymers of the invention comprise an interpolymer of about 60 to about 83% of vinyl fluoride, about 17 to about 40% vinyl ester and about 0.1 to about 12% of an unsaturated acid monomer. As noted above, it is essential that the vinyl ester content be at least about 17% and that the total content of vinyl fluoride and vinyl ester be at least about 78%. It is preferred, however, in these high VF interpolymers that the total VF-vinyl ester content be at least 80% and that no more than about 20% by weight of the terpolymer be another comonomer as an internal plasticizer. These compositions, as noted above, may be applied in solution in common solvents or mixtures thereof, in aqueous dispersions or in the form of organosols and are particularly useful as clear or pigmented surface coatings on metal, wood, and plastic substrates. The resulting surface coatings retain the desirable properties of strength, toughness, chemical resistance and weatherability characteristic of the vinyl fluoride homopolymer and yet are more easily and conveniently applied than previously available vinyl fluoride polymers and also permit the incorporation of large amounts of conventional pigments without adversely affecting the stability of the coatings, which was not previously possible. Furthermore, it has been found that compared to vinyl acetate homopolymers and superior toughness and weatherability as compared to the vinyl fluoride/methyl methacrylate copolymers of the prior art.

The upper limit of the operable range of the vinyl fluoride content (about 83%) is determined by a reduction in weather-ability (gloss loss or embrittlement), adhesivity, resistance to corrosion and thermal stability of terpolymers containing from 84–99% of vinyl fluoride as compared to those containing no more than about 83% vinyl fluoride.

The lower limit of vinyl fluoride content of about 60% for the high VF interpolymers of the invention is demonstrated by relatively lower impact strength, relatively lower abrasion resistance, lower print resistance, lower resistance to accelerated weathering (carbon arc), and in the increased solvent sensitivity, particularly water sensitivity and alkali sensitivity, all properties which are normally associated with the vinyl acetate homopolymers of the prior art.

The lower limit of about 0.1%, or preferably 0.2% for the acid monomer content of the high VF polymers of the invention, is dictated by lower adhesion to metals, lower film hardness, increased dirt pickup and poorer print resistance at lower concentrations. The upper limit, about 12%, for the content of acid monomer, is determined by the maximum that can be tolerated before excessive water sensitivity (particularly alkaline sensitivity) sets in. Larger amounts of acid monomer also hinder production, since the polymerization becomes much more sluggish and the resulting terpolymers exhibit much poorer flow properties. Poor flow properties, of course, limit the application of the polymers by molding techniques. Such polymers also exhibit poor low temperature coalescence from aqueous dispersions, again limiting their manner of application.

Acid monomers operable in the invention include olefinically unsaturated polymerizable acids having an acidity constant of from about 1.0 to about 5.5. More particularly suitable acid monomers are (a) ethylenically unsaturated mono- and di-carboxylic acids having from 3–11 carbon atoms, (b) the anhydrides, half esters, and salts of the unsaturated dicarboxylic acids, and (c) ethylenically unsaturated phosphonic acids, both free and partially esterified, and the salts and anhydrides of these acids. With the anhydrides, polymerization is carried out in aprotic solvents such as ethyl acetate, benzene or acetone. With the others, polymerization is carried out either in organic solvents or in aqueous dispersion or suspension.

More specifically, useful carboxylated monomers include the carboxylic acids of 3–11 carbon atoms such as acrylic acid, methacrylic acid, α-chloroacrylic acid, crotonic acid, vinyl acetic acid, allyl acetic acid, 10-undecylenic acid, maleic acid, fumaric acid and itaconic acid. Examples of the partially esterified polyacids include the methyl, ethyl, propyl, butyl, amyl, 2-chlorethyl and hexyl monoesters of maleic, fumaric and itaconic acid. Operable phosphonic acids include vinyl phosphonic acid and allyl phosphonic acid, and monoalkyl esters of these acids.

Vinyl esters useful in the invention include vinyl esters of the saturated aliphatic monocarboxylic acids, with the carboxylic acids containing 2–18 carbon atoms. Vinyl acetate is preferred for reasons of economy and availability, with a higher vinyl ester being added as another component if softer, more flexible compositions are desired.

As noted above the terpolymers of the invention may optionally be internally plasticized with certain higher vinyl esters, acrylic esters, methacrylic esters, or ethylene. More specifically, examples of suitable higher vinyl esters include vinyl butyrate, vinyl laurate, vinyl stearate and the vinyl esters of α,α-dimethyloctanoic acid. The higher acrylic esters suitable as internal plasticizers include butyl acrylate, hexyl acrylate and others containing up to about 18 carbon atoms in the carbon chain of the alcohol, including lauryl acrylate and stearyl acrylate. The corresponding esters of methacrylic acid are also suitable.

Inert materials such as dyes, pigments, and antioxidants may be incorporated into the polymers of this invention, either by including them in the polymerization mixture, or, preferably, by mixing them with the preformed polymers by means well known in the art, such as ball milling, sand milling, or high speed stirring. Since the polymers of this invention are almost completely transparent to the range of ultraviolet radiation found in sunlight, absorbers of ultraviolet light are desirably incorporated into the polymers to protect a substrate which is itself sensitive to ultraviolet light. This is the case with most woods, cellulosic or synthetic fibers (polyesters, nylon, cellulosic esters) and many plastics of commercial interest (polyethylene, polyvinyl chloride, polypropylene, nylon).

Pigments are readily incorporated into the terpolymers of the invention; up to at least 200 parts of finely divided pigment per 100 parts of polymer being acceptable. Pigments such as titanium dioxide, red lead, and basic lead silico-chromate have been found to work well in the polymer coatings of the invention. While these pigments are known to aid the weathering performance of many polymers, they also are known to promote the thermal degradation of polyvinyl fluoride. However, the terpolymers of this invention may be readily applied together with these pigments without fear of degradation, inasmuch as ambient or only moderately elevated temperatures are required to apply the new polymers to various substrates.

As noted above, the polymers of the present invention can be applied as protective coatings over a wide variety of different substrates, either directly or over an intermediate primer coat. Metals which have been successfully coated include aluminum and anodized aluminum and ferrous metals such as iron and steel, with and without mill scale removed, bare steel, phosphated steel and passivated steel. Other permissible substrates include wood and plastics, including polyvinyl fluoride, polyvinyl chloride and polyethylene, among others. The polymers can be applied to metals directly or to metals the surfaces of which have been pre-treated with adherent anti-corrosive coatings.

Preferred methods of application are as solutions, for example, in methyl ethyl ketone, dimethyl formamide, tetrahydrofuran, ethyl acetate, or mixtures of these solvents, or as dispersions in water or in hydrocarbon mixtures (organosols). The water dispersions are most readily obtained in the polymerization step itself as illustrated by examples below. The organosols can also be obtained by polymerization of the monomer in dispersion in a nonsolvent for the polymer such as hexane or octane, with the presence of lipophilic surfactants. Evaporation of the solvent from true solutions of the new polymers leaves continuous coalesced films which are highly water and weather resistant. In the case of the aqueous dispersions, the addition of a coalescing or film-forming aid, such as trichloroethylene, leads to fairly well-coalesced films on air-drying. With the organosols, mild heating of the applied suspension gives well coalesced films. Such heating is also very effective for the aqueous dispersions; temperatures up to about 125° C. being suitable. Post-heating of the films applied from the aqueous dispersions or organosols further completes the coalescence.

The polymers of the invention are medium to high molecular weight materials; the lower limits of the molecular weight being about 5000. Only the necessity for the polymer to flow rapidly enough to provide coalesced films when applied from dispersion determines the upper limit of the molecular weight of the polymers. It has been found, therefore, that the inherent viscosity (or logarithmic viscosity number) is a more useful criterion for applicability of these polymers than molecular weight. The polymers of this invention have inherent viscosities between about 0.2 and about 5.0, as measured on 0.25% solutions in dimethyl formamide at 30° C. Inherent viscosities of about 0.4 to about 2.0 are preferred. The inherent viscosity is defined from the equation $$n_i = \frac{1}{c}(\ln t/t_o)$$

in which $n_i$ is the inherent viscosity, in deciliters/gm., $t$ is the measured flow time of the polymer solution through the capillary tube, $t_o$ is the flow time of pure dimethyl formamide through the capillary tube, ln is the natural logarithm, and $c$ is the concentration of the polymer in gm./100 ml. of solution. The method of measurement is the capillary or Ostwald method. For further details on such viscosity measurements, see Weissberger "Techniques of Organic Chemistry," vol. 1, part 1, 3rd ed. p. 689 et seq.

A comparison in Table I below of the properties of the vinyl fluoride/vinyl acetate/methacrylic acid terpolymers of the invention containing about 60 to 83% of vinyl fluoride with other such terpolymers containing greater and lesser amounts of vinyl fluoride outside the range of the invention demonstrates the criticality of the recited range.

TABLE I

Comparative properties of vinyl fluoride/vinyl acetate/methacrylic acid terpolymers containing about 60 to 33% vinyl fluoride with those of similar terpolymers containing greater and lesser amounts of fluoride by weight

| | Percent vinyl fluoride [a] | | | | | | | | | | |
|---|---|---|---|---|---|---|---|---|---|---|---|
| | 100 | 90 | 80 | 70 | 60 | 50 | 40 | 30 | 20 | 10 | 0 |
| Weatherability of clear unsupported film under accelerated conditions. | E | GE | | E | E | G | | G | | F | F |
| Tensile strength (p.s.i.) | E (11,000) | GE (8,000) | | G (5,000) | G (4,000) | FG (3,000) | F (2,500) | | F (20) | | F (2,500) |
| Elongation at break (percent) | E (200) | E (225) | | E (250) | E (250) | E (200) | | | F (20) | | P (2-15) |
| Hardness | G | G | FG | F | | F | | | | | G |
| Impact strength | E | GE | E | E | E | P | | | | | P |
| Water resistance | E | | | GE | | | | F | | | P |
| Alkali resistance | E | | | E | | | | PF | | | P |
| Acid resistance | E | | | E | | | | GE | | | FG |
| Aromatic hydrocarbon resistance | E | | | E | | | | G | | | P |
| Abrasion resistance | F | | | E | | | | G | | | |
| Print resistance | E | | GE | G | | | | | PF | | P |
| Resistance to water vapor permeation. | G | | G | F | | | | | | | P |
| Thermal stability | E | P | G | G | | | | | | | G |

[a] The difference between the percentage of vinyl fluoride and 98% is the content of vinyl acetate.

The ratings of Excellent (E), Good (G), Fair (F), and Poor (P) in this table are in comparison to other polymeric materials used in the protective coatings industry, such as methyl mathacrylate copolymers, vinyl chloride copolymers, and acrylic ester copolymers. The polymers of Table I contained about 2% of methacrylic acid.

It is apparent from Table I above that the high VF compositions of this invention are superior to terpolymers of both higher and lower vinyl fluoride content, in the weather-ability of the clear films and in impact strength and abrasion resistance. Also, the 60 to 83% vinyl fluoride compositions are superior to those of lower vinyl fluoride content in ultimate tensile strength, elongation at break, water, alkali, acid, and aromatic hydrocarbon resistance and print resistance. The terpolymers of the invention are also superior in solubility and flowability (for ease of application) and adhesion with respect to polymers of the prior art having a higher vinyl fluoride content. For these reasons the new polymers constitute a decided advance in the fields of protective coatings and formable plastics and plastic laminates.

The properties of the high VF terpolymers of the present invention are compared with those of other durable finishes of the prior art in Table II below.

TABLE II

| | Vinyl fluoride/ vinyl acetate/ methacrylic acid terpolymers | Poly-acrylate type finishes | Soluble vinyl-type finishes |
|---|---|---|---|
| Weatherability | E | FG | FG |
| Abrasion resistance | E | PF | G |
| Toughness | E | G | F |
| Impact resistance | E | G | F |
| Flexibility | E | E | F |
| Thermal stability | G | F | P |
| Resistance to— | | | |
|   Water vapor | G | F | F |
|   Aromatic hydrocarbons | G | PF | F |
|   Strong acids | E | PG | E |
|   Strong alkali | E | FE | E |
|   Chlorinated solvents | G | P | G |
| Dielectric strength | E | F | F |

In other properties not listed, the terpolymers of the present invention have been found to be about the equal of the competitive materials. This includes corrosion resistance, adhesion, water resistance, hardness, ease of application, dirt pickup, initial gloss, and oil and grease resistance.

Preparation of the terpolymers

The terpolymers of this invention are prepared by polymerization of a mixture of the monomers in the presence of any suitable free radical initiating agent, including azo compounds, peroxy compounds, ultraviolet light and ionizing radiation, in either relatively inert organic solvents or aqueous media. Useful solvents have been found to include benzene, cyclohexane and benzene-toluene, benzene-isopropyl alcohol and benzene-acetone mixtures. Cyclohexane, isopropyl alcohol, toluene and acetone are useful as chain transfer agents to lower the molecular weight (inherent viscosity) of the polymers, thus providing improved flow properties and coalescence, and permit high solids content solutions in a viscosity range permitting application of the polymers in the form of lacquers. The operable inhert viscosity range for this purpose is about 0.4 to 0.6. Pressures as low as 100 p.s.i. and as high as 22,000 p.s.i. have been employed successfully in the polymerization process depending on the particular polymer being formed, the free radical initiator used, and the polymerization temperature. In aqueous media, surface active agents may be used to aid in maintaining the monomers and product in very small particle size so that dispersions result. A product in the form of beads can also be obtained in aqueous systems if less than 0.1% of the surface active agent is present. The reaction can be carried out either in a batch or continuous process. The latter is preferred, since the products from aqueous dispersion appear to undergo the most complete coalescence on air drying when made this way, leading to good water resistance and excellent weatherability. In the preferred processes, a temperature in the range from about 50° C. to about 190° C. is normally employed with feed rates adjusted to provide residence times as short as possible, preferably less than 15 minutes.

In the process examples and product evaluation below, all parts are by weight. Elemental and instrumental analyses were carried out using standard techniques well known in the art. Accelerated weathering tests were carried out in the "Atlas WeatherOmeter," Model XW (Atlas Electrical Devices Company, Chicago, Ill.), using the carbon arc, filtered light and the conventional 102 minute light exposure, plus an additional 18 minutes of light plus water spray, all in accordance with ASTM D1499–59T.

In all cases, including the controls, the purified dry polymer was formed into a film under heat and pressure, or was dissolved in a ketone (generally methyl ethyl ketone) and cast on a suitable substrate, and then was either permitted to dry in the ambient air or was dried in a forced air oven.

EXAMPLE 1

Preparation of high vinyl fluoride/vinyl acetate/ methacrylic acid terpolymer

Under a nitrogen atmosphere, 0.072 gm. of methacrylic acid dissolved in 7.2 gm. vinyl acetate was added each minute to a 286 ml. #316 stainless steel stirred reactor. Also, 41.0 gm. per minute of inhibitor-free vinyl fluoride and 0.0048 gm. azodicyclohexane carbonitrile initiator dissolved in 16 gm. of a 3/1 benzene-toluene mixture were added each minute to the reactor. The reactor was kept essentially liquid-full of reactant mixture at the reaction temperature, which was 163–165° C. The pressure in the vessel was maintained at 22,000 p.s.i. by a pressure release valve in the exit line. As the reactants were continuously pumped into the vessel, the product was continuously discharged from the system through the pressure release valve. The residence time in the reactor was about 8 minutes. About 190–240 gm. per hour of polymeric product resulted. The product was taken up in acetone and reprecipitated in petroleum ether in a container fitted with a high-speed stirrer. The product was then dried in a vacuum oven at 80° C. for 24 hours. The conversion to product was 8% based on total monomers. The polymer composition, by percent fluorine and by neutralization equivalent, was about 67/31/2% (by weight) vinyl fluoride/vinyl acetate/methacrylic acid. The inherent viscosity was 0.61 (0.25% solution in dimethyl formamide at 25° C.). The polymer was readily soluble in methyl ethyl ketone, benzene, tetrahydrofuran, and dimethyl formamide, and gave clear, very tough, glossy films on evaporating such solutions at room temperature or at 100° C. The softening point of the dried film, as determined with a penetrometer, was 18° C., indicating fairly good coalescence could be expected from aqueous dispersion at room temperature. On the other hand, the tack temperature was 82–85° C., indicating a considerable retention of strength with rise in temperature.

The polymer was partially crystalline, with a melting point range of 145–166° C., as determined by differential thermal analysis (an endotherm existed over this temperature range). Mechanical property measurements carried out on an Instron tester (strain rate 100% per minute on 3" x ¼" strips, 2" between jaws), showed a tensile strength at break of 2200 p.s.i., an elongation at break of 287% and an initial elastic modulus of 4600 p.s.i. Reverse impact strength of the film on aluminum was over 48 inch-pounds, and the cold crack temperature was lower than −72° C. The temperature at which a 5% weight loss occurred in air (when samples were heated at a rate of 6° C./min.) was 326° C. The abrasion coefficient (liters of sand per mil) of the film on aluminum was 137, whereas a vinyl chloride copolymer (Bakelite VAGH available from Bakelite Co., a Division of Union Carbide and Carbon Co.) was only 36, and a commercial thermoset acrylic was 38. Adhesion of the film to aluminum was excellent, surviving a boiling water test for 288 hours. Adhesion to ground steel and to white pine was also good. The excellent solvent and chemical resistance of this terpolymer compared with those of competitive materials and those of terpolymers of lower vinyl fluoride content are demonstrated in Table II below.

TABLE III

Solvent sensitivity tests

| Solvent | Percent weight gain | | | | | |
|---|---|---|---|---|---|---|
| | A | B | C | D | E | F |
| H₂O | 1.32 | 3.52 | 2.39 | 1.66 | 2.9 | −0 |
| 10% NaOH | 0.84 | −6.39 | 1.43 | 1.08 | 1.70 | 11.9 |
| 20% NaOH | 0.53 | −7.47 | 1.00 | 1.64 | 0.80 | [1] −12.0 |
| 35% NH₄OH | 8.55 | 161.0 | 2.77 | 2.04 | 7.00 | 6.2 |
| 10% HCl | 0.95 | −3.08 | 1.59 | 1.58 | 1.33 | 4.5 |
| 20% HCl | 0.71 | 0.97 | 1.48 | 1.65 | 2.0 | 23.0 |
| 20% H₂SO₄ | 1.05 | −2.00 | 1.44 | 1.62 | 1.2 | 2.0 |
| Formic acid | 152.0 | Dissolved | 6.20 | 7.7 | 29.0 | Dissolved |
| Acetic acid | 289.0 | Dissolved | 26.4 | Dissolved | 1,370.0 | Dissolved |
| Ethylene glycol | 0.97 | 0 | 1.26 | 1.58 | 1.0 | 0 |
| Delco automatic transmission fluid | 0.67 | −4.78 | 0.97 | 0.88 | 0.7 | 1.3 |
| Methanol | 9.8 | 17.42 | 8.03 | 15.2 | 155.0 | 2.0 |
| Methyl ethyl ketone | Dissolved | Dissolved | Dissolved | Dissolved | 322.0 | Dissolved |
| Toluene | 23.8 | >100 | 41.3 | 43.4 | 604.0 | Dissolved |
| Trichloroethylene | 28.2 | Dissolved | 22.3 | 45.3 | 1,433.0 | Dissolved |
| Methylene chloride | Dissolved | Dissolved | Dissolved | Dissolved | 1,045.0 | Dissolved |
| Kraft salad oil | 1.43 | −4.3 | 1.42 | 2.10 | 0.3 | −0 |
| Sol 150 (high boiling aromatics) | 5.81 | 8.2 | 47.0 | 23.2 | 141.0 | 17 |
| n-Heptane | 1.0 | 1.42 | 0.94 | 1.09 | 1.7 | [1] −10 |
| n-Naptha | 0.49 | −2.35 | 0.80 | 1.68 | 4.6 | −5 |

[1] Embrittled.

NOTE.—A=67/31/2 vinyl fluoride/vinyl acetate/methacrylic acid; B=32/65.1/2.9 vinyl fluoride/vinyl acetate/methacrylic acid; C=86/13/1 vinyl chloride/vinyl acetate/maleic anhydride (vinylite VMCH, available from Carbide and Carbon Chemicals Co.); D=91/3/5.7 vinyl chloride/vinyl acetate/vinyl alcohol (Vinylite VAGH availabe from Carbide and Carbon Chemicals Co.); E=Methyl methacrylate/ethyl acrylate/methacrylic acid (Rhoplex AC-34. Slightly crosslinked film coagulated from the commercial dispersion with sodium chloride and vacuum oven dried. Available from Rohm & Haas Co.); F=Commercial Red Railroad acrylic lacquer (available from E. I. du Pont de Nemours & Co.). All of the above samples were exposed for seven days at room temperature.

The solvent properties of the terpolymers of this invention resemble those of the vinyl chloride/vinyl acetate maleic anhydride terpolymer. However, the latter have much poorer mechanical properties than the terpolymers of this invention. For example, sample A, the vinyl fluoride/vinyl acetate/methacrylic acid terpolymer with 60 parts TiO₂ pigment/100 parts of resin, has a tensile/elongation/modulus of 2000/130/64,000 whereas sample C, the vinyl chloride/vinyl acetate/maleic anhydride polymer has a tensile/elongation/modulus of 6600/2/477,000. Thus the vinyl fluoride terpolymer is far tougher (tensile strength multiplied by the elongation to break) than the vinyl chloride terpolymer.

The remarkable accelerated weathering data of the high VF polymers of this invention are shown in Table IV. The rapid fall-off of the percent elongation to break of the methyl methacrylate homopolymer and the copolymers (the most durable nonfluorinated coating materials) entries (1) and (2), on weathering is apparent. The poorer stability of the terpolymers containing 84% vinyl fluoride or 32% vinyl fluoride (as seen by the drop in percent elongation to break on continued exposure) compared to the 60–83% VF terpolymers of this invention is also shown.

Contrary to the experience of the prior art, pigmented systems containing titanium dioxide, red lead, binary lead silico-chromate and the like, not only do not interfere with the thermal stability of the terpolymers, even those containing as much as 60 to 83% vinyl fluoride, but when such coating compositions are applied at ambient to moderately raised temperatures of up to about 125° C.–150° C. may actually increase weatherability. Some examples are shown in Example 9, Table VI. It should be noted that the high vinyl fluoride content polymers tend to exhibit residual crystallinity, especially in non-solvents such as water, and, therefore, the moderately elevated temperatures of up to about 125° C. should be employed where necessary to aid in complete coalescence from aqueous dispersions.

TABLE IV
Accelerated weathering data

| Polymer | Tensile/elongation/modulus/inherent viscosity | | | |
|---|---|---|---|---|
| | Initial | 500 hours exposure | 1,000 hours exposure | 1,500 hours exposure |
| 96/4% methyl methacrylate/ethylacrylate | 8,900/2.8/380,000/0.3 | 10,000/3.4/549,000/0.15 | 2,700/0.8/423,000/0.28 | Brittle |
| 100% methyl methacrylate | 9,900/3.7/384,000/0.6 | 5,300/12/558,000/0.18 | 1,400/0.5/321,000/0.38 | Brittle |
| 84/15/1.3% vinyl fluoride/vinyl acetate/methacrylic acid | 2,900/101/181,000/0.59 | 3,700/34/230,000/0.61 | 3,800/2.1/222,000/0.85 | Brittle |
| 82/17/1.2% vinyl fluoride/vinyl acetate/methacrylic acid | 3,500/249/108,000/0.78 | 4,100/293/230,000/0.88 | 4,100/259/228,000/0.73 | 3,400/37/172,000/1.18 |
| 67/31/2% vinyl fluoride/vinyl acetate/methacrylic acid | 2,200/286/4000/0.61 | 3,800/169/162,000/0.67 | 3,600/153/180,000/0.56 | ᵃ 2,100/71/100,000/0.71 |
| 32/65/2.9% vinyl fluoride/vinyl acetate/methacrylic acid | 3,700/176/289,000/0.49 | Satisfactory | Brittle | |
| 23/73.1/3.9 vinyl fluoride/vinyl acetate/methacrylic acid | Satisfactory | Satisfactory | Brittle | |

ᵃ After 2,500 hours tensile/elongation/modulus was still 1,800/70/75,000/0.47.

EXAMPLE 2

Preparation of an 82/16/2% vinyl fluoride/vinyl acetate/methacrylic acid terpolymer The procedure of Example 1 was repeated except that 0.036 gm. of methacrylic acid dissolved in 3.6 gms. of vinyl acetate were added each minute to the reactor. The temperature was kept at 164–165° C., and the pressure at 22,000 p.s.i. About 22 gm./hour of product were obtained (about 8% conversion), and the terpolymer had an inherent viscosity in dimethyl formamide of 0.71–0.78. This terpolymer is very tough (tensile/elongation/initial modulus values of 3500 p.s.i./249%/108,000 p.s.i.), has excellent weatherability (although not as good as the 67/31/2 terpolymer). This product was insoluble in cold methyl ethyl ketone, but was soluble in hot methyl ethyl ketone and stayed in solution for over one week after cooling to room temperature. The good solvent resistance, chemical resistance, impact resistance, and low temperature properties (cold crack) demonstrated in Example 1 were also characteristic of this material.

EXAMPLE 3

Other syntheses of polymers within the scope of this invention are tabulated in Table V below. Note that a variety of initiators, solvent media, and polymerization pressures are possible. Also, that additives may be present to control polymer properties. These polymers have the desirable properties characteristic of those previously described above.

TABLE V.—POLYMERIZATION PROCESS EXAMPLES 3–8

| | Monomers | Feed rate (gms./min.) | Initiator feed (gms./min.) | Solvent feed (gms./min.) | Reactor pressure, p.s.i. | Temp. reactor (° C.) | Product | | Inherent viscosity |
|---|---|---|---|---|---|---|---|---|---|
| | | | | | | | Conversion | Comparative | |
| (3) | Vinyl fluoride / Vinyl acetate / Methacrylic acid | 10 / 1.5 / 0.3 | PAᶜ (0.018) | Benzenecyclohexane (9) | 10,000 | 164–180 | 45 | 78/17/5 | 0.2 |
| (4) | Vinyl fluoride / Vinyl acetate / Methacrylic acid | 10 / 0.75 / 0.25 | PAᶜ (0.01) | Benzene (4) | 10,000 | 166–176 | 7–11 | 66/28/6 | 0.29 |
| (5) | Vinyl fluoride / Vinyl acetate / Methacrylic acid / Butyraldehyde | 7 / 1 / 0.0125 / 0.0090 | QY641ᵈ (0.048) | H₂O (20) | 1,500 | 97–98 | 23 | 68.2/31/0.8 | 0.41 |
| (6) | Vinyl fluoride / Vinyl acetate / Methacrylic acid | 7 / 1 / 0.025 | QY641ᵈ (0.048) | H₂O (10) | 1,500 | 96–97 | 36 | 77/22/0.7 | 0.67 |
| (7) | Vinyl fluoride / Vinyl ester ᵃ / Methacrylic acid | 7 / 1 / 0.025 | QY641ᵈ (0.048) | H₂O (20) | 1,850 | 98 | 48 | 67.6/31.6/0.8 | 0.57 |
| (8) | Vinyl fluoride / Vinyl ester ᵇ / Methacrylic acid | 7 / 1 / 0.025 | QY641ᵈ (0.048) | H₂O (20) | 1,850 | 100 | 31 | 70.8/28.4/0.8 | 0.29 |

ᵃ Vinyl ester is the vinyl ester of a mixture of highly branched saturated aliphatic acids containing 9 carbon atoms, largely 2,2,4,4-tetramethyl valeric acid (Shell Chem. Co., Bulletin PD141, Dec., 1962).

ᵇ Vinyl ester was a vinyl ester of the formula of alkyl—$\underset{\underset{CH_3}{|}}{\overset{\overset{CH_3}{|}}{C}}$—GOOH of 10 carbon atoms (carbonylation product of propylene trimmer (Shell Chem. Co., Data Sheet 33J3, May, 1964).

ᶜ PA-tert-butyl peracetate.

ᵈ QY641=azoamidine hydrochloride.

EXAMPLE 9

To see the effect of pigment on the accelerated weatherability of the VF/VAc/MAA terpolymers, titanium dioxide (grade R610, Du Pont) was mixed with the polymers dissolved in methyl ethyl ketone with a high speed mixer. Sixty parts of titanium dioxide per 100 parts of polymer were used. No thermal stabilizers, antioxidants, or U.V. screeners were present. These solutions were cast on glass and dried for one week at room temperature. The films were then exposed in the carbon arc WeatherOmeter (Atlas XW Machine), and strips were removed at intervals for tensile testing. Results are summarized in Table VI. Even though the coalescence is improved with a mild heat treatment as shown in entry (1) vs. entry (2) it can be seen that the high VF polymers of this invention, containing up to 82% VF, stabilize at good elongation and toughness values, while the 84% VF composition did not.

TABLE VI
Accelerated weathering data on pigmented polymer films

| Polymer | Preliminary heat treatment (90° C./30 sec.) | Tensile strength (p.s.i.)/percent elongation to break/ initial modulus values (p.s.i.) | | |
|---|---|---|---|---|
| | | Initially | After 1,000 hrs. | After 2,380 hrs. |
| 67/31/2 VF/VAc/MAA ᵃ | Yes | 2,000/130/64,000 | 2,000/55/124,000 | 2,800/55/184,000 |
| 67/31/2 VF/VAc/MAA ᵃ | No | 1,600/65/75,000 | 1,700/20/167,000 | 2,100/17/224,000 |
| 82/17/1.2 VF/VAc/MAA ᵃ | No | 1,300/238/66,000 | 1,900/37/248,000 | 4,200/31/305,000 |
| 84/15/1.3 VF/VAc/MAA ᵃ | No | 1,300/61/110,000 | 2,300/6/274,000 | 3,400/2/270,000 |
| 32/65/2.9 VF/VAc/MAA ᵃ | No | 1,900/118/128,000 | ᵇ 2,700/1/326,000 | |
| 23/73.1/3.9 VF/VAc/MAA ᵃ | No | 1,500/93/237,000 | (ᵇ) | |

ᵃ VAc=Vinyl acetate; MAA=Methacrylic acid.
ᵇ Brittle.

Low VF interpolymers

The interpolymers of the present invention, which have a lower vinyl fluoride (VF) content than those described above, i.e., about 10 to 59% as compared to 60 to 83%, surprisingly retain the desirable properties of vinyl fluoride in a high and useful degree, although to a lesser degree than the outstanding properties of my higher vinyl fluoride content interpolymers. More specifically, the low VF interpolymers of the invention provide surface coatings which, while having highly desirable properties of strength, toughness, chemical resistance and weatherability, when compared to the interpolymers containing larger percentages of vinyl fluoride are not as resistant to accelerated weathering as observed in the Atlas XW Carbon or Xenon Arc Weatherometer, and have somewhat lower impact strength, toughness (elongation at break) and water, solvent, alkali, abrasion and print resistance. The low VF interpolymers, however, exhibit improved coalescence, gloss, gloss retention and wet adhesion to wood and phosphatized steel when compared to my high VF interpolymers. It has also been found, entirely unexpectedly, that the low VF interpolymers are superior, not only to polyvinyl fluoride itself, but to a typical vinyl fluoride/vinyl acetate/methacrylic acid terpolymer (VF/VAc/MAA: 67/31/2%) of my high VF interpolymers in electrical properties, in that they have a lower dissipation factor and higher volume resistivity. The electrical properties of such high and low VF interpolymers of the invention are shown in Table VII below.

The preparation of the low VF interpolymers is described in Examples 10 through 13 below and in Examples 14 through 26 in Table VIII.

was 29% based on total monomers. The polymer composition, by percent fluorine and by the neutralization equivalent, was 23/73.1/3.9% (by weight VF/VAc/MAA. The inherent viscosity was 0.43 (0.25% solution in dimethyl formamide at 25° C.), and the Knoop hardness number 9.6. The polymer was readily soluble in polar organic solvents, insoluble in straight chain hydrocarbons. The heat distortion temperature, with a penetrometer, was 40° C. [100% polyvinyl acetate (PVac) was also 40° C.], the tack temperature was 850° C.—well above the minimum tack temperature for use in most protective coating applications. The cold crack temperature, when immersed in naphtha, was between −30° C. and −50° C. The tensile/elongation/initial modulus values are 7000 p.s.i./1.9%/454,000 p.s.i. for the clear films, and 1500/93/237,000 for the pigmented, air-dried film. Dry and wet adhesion to ground steel, "Bonderite" 100, and white pine was excellent, and hot-wet adhesion to the ground steel was also excellent. Corrosion resistance (resistance to salt spray) for pigmented coatings was good on ground steel or "Bonderite" 100. Weatherability data are excellent.

EXAMPLE 11

This was carried out similarly to Example 10, except run at somewhat higher temperatures and to higher overall conversion. Over 90% of the vinyl acetate fed was incorporated in the polymeric product. The composition was 32/65.1/2.9% VF/VAc/MAA, $\eta_{inh}$ 0.49, and Knoop hardness number 6.5. The heat distortion temperature was 35° C., tack temperature 83° C., cold crack temperature between −68° and −75° C., and tensile/elongation/

TABLE VII
Electrical properties of polymers

| | Dielectric constant, 25° C. | Dissipation factor, 25° C. | Volume resistivity ohm-cm., 25° C. | Dielectric strength 60 c.p.s., kilovolt/mil |
|---|---|---|---|---|
| PVF | 8.5 (1,000 c.p.s.) | 1.6 (1,000 c.p.s.) to 3.0 (100,000) | 3×10¹³ | 3.0 (2 mil). |
| 67/31/2 VF/VAc/MAA (64–48A (1,500)) | 5.14–4.43 (1,000–100,000 c.p.s.) | 6.3–4.3 (1,000–100,000) | 1.4×10¹⁴ | 1.7 (5 mil). |
| 32/65/2.9 VF/VAc/MAA (65–27(1,500)) | 3.60–3.39 (100–100,000 c.p.s.) | 1.2–1.6 (100–100,000) | 4.5×10¹⁵ | 2.2 (5 mil). |
| PVCl: | | | | |
| Rigid | 2.3–3.7 | 2.3 [a] | 1×10¹⁴ to 5×10¹⁶ | 0.25–1.30. |
| Flexible | 5.5–9.0 | 5–15 | 1×10¹² to 7×10¹⁴ | 0.2–1.0. |
| PMMA[b] | 2.2–4.5 | 2–6 | >10¹⁵ | 0.4. |
| E/VAc | 2.5–3.1 (60–100,000 c.p.s.) | 0.3–2.0 (60–10,000) 3–4 (10⁵ c.p.s.) | 1.5×10⁵ | 0.45–0.7. |
| PVF₂ | 6.6–8.4 | 1.8–17 | 2×10¹⁴ | 0.26–1.3. |
| PVCl₂ | 3–6 | 3–8 | 10¹⁴–10¹⁶ | 0.4–0.6. |
| Phenolics | 4–7.5 | 1–15 | 10¹²–10¹³ | 0.3–0.4. |
| PE | 2.2–2.9 | <0.05 | >10¹⁶ | 0.4–0.6. |
| 90/10 E/MAA (76% Na plus ionomer) | 2.4 | 0.34 | 2.4×10⁻⁷ | 0.9. |
| Mica | 5.6–6.8 | 0.06–0.25 | 10¹³–10¹⁶ | |
| Polystyrene | 2.5–2.7 | 0.01–0.04 | >10¹⁸ | 0.4–0.7. |
| PTFE[c] | 2.0 | <0.02 | >10¹⁸ | 0.4–0.5. |

[a] 36% R.H., 75° F.
[b] Poly(methyl methacrylate).
[c] Poly(tetrafluoroethylene).

EXAMPLE 10

Preparation of a low vinyl fluoride/vinyl acetate/methacrylic acid terpolymer

Under a nitrogen atmosphere, 0.14 gm. methacrylic acid (MAA), 7 gm. vinyl acetate (VAc), and 11.4 gm. of vinyl fluoride (VF) were passed each minute into a 286 ml. #316 stainless steel stirred reactor. At the same time, 0.004 gm. tert-butyl peracetate initiator dissolved in 4.8 cc. of a 3/1 mixture of benzene and cyclohexane were passed each minute into the reactor. The internal temperature was 172–180° C., and pressure was 10,000 p.s.i. The reactor was kept essentially full of liquid and the product overflow was continuously discharged from the system through the pressure release valves. The residence time in the reactor was about 8 minutes. After 360 gm./hour of polymeric product resulted, which was taken up in acetone and reprecipitated in petroleum ether under vigorous stirring. The product was dried in vacuum oven at 60° C. for 48 hours. The conversion modulus values for the clear film 3700/176/289,000. The tensile yield value was 4300 p.s.i. The tensile/elongation/modulus values for the air-dried TiO₂-pigmented film (60 phr.) were 1900/118/128,000. The terpolymer was readily soluble in polar solvents, such as cold methyl ethyl ketone. Adhesion to steel and white pine was excellent, and corrosion resistance of pigmented films on ground steel was good. Electrical properties are excellent (Table VII). In weathering resistance, original gloss values of the pigmented film on ground steel were 59. Gloss values after exposure in the xenon-arc Weatherometer were as follows: 607 hours—61, 1016 hours—65, 1553 hours—65.

EXAMPLE 12

Run as Examples 10 and 11. The polymer was a 48/47.2/4.8 VF/VAc/MAA terpolymer; $\eta_{inh}$ 0.22, KHN 4.5. T/E/M₁ values 1800/125/124,000 heat dist. temperature 32° C., tack temperature 62° C. The adhesion, corrosion resistance, and weatherability resembled those of the products of Examples 10 and 11.

EXAMPLE 13

Under a nitrogen atmosphere, the following liquids were continuously fed to a 300 cc. stainless steel stirred reactor; (1) 5 gm. per minute of a 1.25% solution of methacrylic acid in vinyl acetate, (2) 5.2 gm./minute of vinyl fluoride, (3) 4 gm./minute of an aqueous solution containing 2.5% Tergitol NP-40 (a polyethylene oxide adduct of an alkyl phenol) and 0.12% sodium bisulfite, and (4) 4 gm./minute of an aqueous solution containing 2% Duponol ME (a long-chain sodium alkyl sulfate) and 0.8% ammonium persulfate. The temperature in the reactor was 104–105° C., pressure 850 p.s.i. The effluent from the reactor was an aqueous dispersion containing about 36% polymers solids. The polymer composition, after isolation from the emulsion was 22/76/2% vinyl fluoride/vinyl acetate/methacrylic acid. $\eta_{inh}$ 0.62, with less than 1% of the polymer insoluble in dimethyl formamide. Over-all conversion to this polymer was 48–49%.

On air dry at room temperature for 20 hours, this dispersion gave a clear, colorless, tough, flexible film, which had good wet strength on subsequent exposure to liquid water. The emulsion had good mechanical and shelf stability, and could be subjected to changes in pH or to addition of components familiar to the paint formulators art without coagulation of the polymer.

Other variations in process are illustrated in Examples 14 through 26 in Table VIII.

TABLE VIII
Summary of Examples 14–21 [j]

| Ex. | Monomers [d] | Feed rate (gms./min.) | Reaction medium | Reactor pressure (p.s.i.) | Temp. in reactor (°C.) | Polymer product (by wt.) | Inherent viscosity | Conversion based on total monomers |
|---|---|---|---|---|---|---|---|---|
| 14 | VF [a]<br>VAc [b]<br>MAA [c] | 5<br>5<br>0.063 | | 4,000 | 96–116 | 39/59/2 A; 85/63/2 B (aqueous dispersion) | 1.40 | 37–53; 64–69 |
| 15 | VF<br>VAc<br>MAA | 11.4<br>7.0<br>0.14 | PA (0.004) ; [f] 3/1 benzene/(4.8) cyclohexane | 10,000 | 172–180 | 23/73.1/3.9 (solution) | 0.43 | 29 |
| 16 | VF<br>VAc<br>MAA | 11.4<br>7.0<br>0.14 | PA (0.004) ; [f] 3/1 benzene/cyclohexane (4.8) | 10,000 | 180–195 | 32/65.1/2.9 (solution) | 0.49 | 54 |
| 17 | VF<br>VAc<br>MAA | 12<br>7.0<br>0.14 | PA (0.0005) ; [f] benzene/cyclohexane (15.6) | 10,000 | 160–172 | 24/69.2/6.8 (solution) | 0.45 | 14 |
| 18 | VF<br>VAc<br>MAA | 12<br>5.9<br>0.06 | PA (0.0005) ; [f] benzene/cyclohexane (15.6) | 10,000 | 144–152 | 48/47.2/4.8 (solution) | 0.22 | 11 |
| 19 | VF<br>VAc<br>MAA | 5.0<br>5.0<br>0.0625 | H₂O (20); "DuPonol" ME [e] 0.1; (NH₄)₂S₂O₈ 0.028; NaHSO₃ 0.003 | 650 | 94–96 | 21/78/2.6 (aqueous dispersion) | 1.38 | 27 |
| 20 | VF<br>VAc<br>MAA<br>Butyraldehyde | 5.2<br>4.65<br>0.058<br>0.0582 | H₂O (20); "DuPonol" ME [e] 0.1; (NH₄)₂S₂O₈ 0.028; NaHSO₃ 0.006 | | 92 | 21/77/1.9 (aqueous dispersion) | 0.52 | 36 |
| 21 | VF<br>VAc<br>MAA<br>Butyraldehyde | 5.2<br>5.0<br>0.0625<br>0.062 | H₂O (20); QY641 (0.06) [g] | 850 | 100 | 31/67/2 (fine beads) | 0.67 | 48 |
| 22 | VF<br>VAc<br>MAA | 5.2<br>5.0<br>0.063 | H₂O (8.0); "Tergitol" NP-40 (0.21); [h] QY641 (0.03) | 850 | 96–98 | 27/71/2 (aqueous dispersion) | 1.06 | 58 |
| 23 | VF<br>VAc<br>MAA | 5.2<br>5.0<br>0.063 | H₂O (9); "Tergitol" NPX (0.21); [h] QY641 (0.06) | 850 | 100–103 | 32/65/2 (aqueous dispersion) | 1.0 | 64 |
| 24 | VF<br>VAc<br>MAA | 5.2<br>5.0<br>0.063 | H₂O (8); "Duponol" ME (0.08) ; [e] "Tergitol" NP-40 (0.10) ; [h] (NH₄)₂S₂O₈ (0.032); NaHSO₃ (0.005) | 850 | 101–106 | 22/96/2 (aqueous dispersion) | 0.62 | 49 |
| 25 | VF<br>VAc<br>Itaconic acid | 5.2<br>5.0<br>0.063 | H₂O (9); "Tergitol" NP-40 (0.21); QY641 (0.03) | 850 | 100–101 | 22.9/76.3/0.8 (aqueous dispersion) | 0.78 | 52 |
| 26 | VF<br>VAc<br>MAA | 39<br>61<br>0.77 | H₂O (150); "Triton" X-301 (15) [i] 20% solids; (NH₄)₂S₂O₈ (0.1); NaHSO₃ (0.025) | 325; 490 | [j] 55–64 | 21.4/75/4 (coagulum) | 2.44 | 22 |

[a] VF is vinyl fluoride.
[b] VAc is vinyl acetate.
[c] MAA is methacrylic acid.
[d] All examples were carried out continuously except Example 26.
[e] "Duponol" ME is a long chain sodium alkyl sulfate available from E. I. du Pont de Nemours Co.
[f] PA is tert-butyl peracetate, an initiator.
[g] QY641 is azobisisobutyroamidine hydrochloride, an initiator.
[h] "Tergitol" NP-40 and Tergitol NPX are polyether additives of alkylphenol surfactants.
[i] "Triton" X-30 is an alkyl aromatic polyethylene glycol sulfate sodium salt.
[j] For 8 hours.

EXAMPLE 27

Under a nitrogen atmosphere, the following solutions were continuously fed into a 300 cc. stainless steel stirred reactor; solution A composed of 2.0 gms. vinyl acetate, 0.375 gms. of 2-ethylhexylacrylate and 0.05 gms. of methacrylic acid; solution B composed of 5% Tergitol NP–40 surfactant in $H_2O$, 3% Triton X–200 surfactant, 0.8% WP–09 hydroxy ethyl cellulose and 0.3% $NaHSO_3$; solution C composed of 1.8% ammonium persulfate; and solution D composed of liquified vinyl fluoride. These feeds were added in the following ratio (gms/minute); 2.5/2.5/3.2/10. The reaction temperature was 98–100° C.; pressure 1200 p.s.i. The polymer came out in well-dispersed form, approximately 600 gms./hr., 36% solids. Unreacted VAc and VF were removed by evaporation, leaving a polymer containing 40/47/11/2 VF/VAc/2-EHA/MAA, as found by analysis for F, C, H and the carboxyl content by electrometric titration. Conversion of the 2-EHA was essentially quantitative, and conversion of the VAc over 80%.

The inherent viscosity was 0.61 with less than 7% of the polymer insoluble in dimethyl formamide. Minimum film forming temperature was 40° F. The films were clear, tough and very flexible. Essentially no unpolymerized 2-ethylhexylacrylate was present in the aqueous dispersion, as determined by a vapor chromatographic analysis. The final polymer solids were 54.5%.

The polymer dispersion was then treated with ethyleneimine, in an amount equal on a molar basis to the carboxyl content of the polymer. This was accomplished by adding hydrazine (0.2% based on the polymer), potassium tripolyphosphate (0.2%), then concentrated ammonia until a pH of 5.5 was reached. Ethyleneimine diluted 1/4 with $H_2O$ was then added drop by drop at room temperature over a period of 0.5 hours. The final pH was 6.9, viscosity 86 Krebs units.

An exterior paint was made containing the following components in the Grind (using a Cowles dissolver).

|  | Gms. |
|---|---|
| Carbitol solvent | 350 |
| "Tamol 731" dispersing agent | 100 |
| "Triton CF–10" wetting agent | 25 |
| "Colloid 581-B" antifoamer | 20 |
| "Ti-Pure R–960" titanium dioxide | 1750 |
| "Snowflake" whiting (calcium carbonate) | 2650 |
| Mica, 325 mesh water ground | 250 |
| Cellosize WP4400 (3%) | 500 |
| $H_2O$ | 900 |

To 261.8 g. of the Grind was added the Reduction with moderate stirring, composed of 144.5 gms. of the polymer dispersion, 9.5 gms. $H_2O$, 24 gms. 3% "WP4400" hydroxyethyl cellulose, 8.2 gms. "Super-Ad-It" solution, and 4.5 gms. "Monastral Green" B pigment. The amount of polymer in the Reduction was chosen to give 47.5 pigment volume concentration in the paint.

Southern yellow pine panels were painted with the above system over a soft vinyl acetate/ethylene copolymer paint as primer ("Elvace" PB3–1952, a development grade paint of the Du Pont Co.), and exposed in Florida for 36 months with a 45° southern exposure. Controls at the same pigment volume concentration using the same Grind were based on (1) an acrylic emulsion "Rhoplex" AC–35 (Rohm & Haas Co.), (2) vinyl-acrylic emulsion ("Ucar" 180 Union Carbide Chemical Co.), (3) a vinyl acetate copolymer ("Everflex BG," Dewey and Almy Co.). Results are tabulated below in Table IX and an outstanding advance in crack resistance (the most important criterion) is seen over other systems. In the ratings in Table IX, (10) is perfect.

EXAMPLES 28 AND 29

A 50/41/7/2% VF/VAc/2-EHA/MAA interpolymer was prepared in similar fashion to the tetrapolymer in Example 27, with adjustment of the feed rates, to give the polymer of this composition. Also a 30/60/9/1.9% VF/VAc/2-EHA/MAA tetrapolymer was prepared. The dispersions were iminated as above, and paints prepared as described in Example 27. Weathering data for these paints are shown in Table IX—and they, like the 40/47/11/2% tetrapolymers, show a property spectrum superior to the acrylic, vinyl acrylic, or vinyl acetate copolymer controls.

TABLE IX

Comparative weathering exposure data for controls and low vinyl fluoride—content tetrapolymers

| Composition | Chalk | Mildew | Crack | Flake |
|---|---|---|---|---|
| Acrylic emulsion ("Rhoplex" AC–35) | 9 | 5 | 6 | 10 |
| Vinyl acrylic emulsion ("Ucar" 180) | 8 | 6 | 4 | 9 |
| Vinyl acetate copolymer ("Everflex" BG) | 8 | 8 | 7 | 9.5 |
| (27) VF/VAc/EHA/MAA (40/47/11/2) | 7 | 8 | 9 | 10 |
| (28) VF/VAc/EHA/MAA (50/41/7/2) | 7 | 8 | 8 | 9 |
| (29) VF/VAc/EHA/MAA (30/60/9/1.9) | 8 | 8 | 9 | 9 |

EXAMPLE 30

In this example a 34/60/51% VF/VAc/E/MAA tetrapolymer was prepared in a batch reactor and exhibited excellent film properties. The emulsion was made into an outside paint. Exceptional performance over old chalked oil based coatings on weathering is shown. Details follow:

A #316 stainless steel autoclave with a 2-gallon capacity was fitted with a ribbon stirrer, with 3 feed lines; for monomer, surfactant and initiator. The initial charge contained about 8% of the VAc, 0% of the MAA, 15% of the nonionic and anionic surfactants and buffer, and 50% of the protective colloid, initiator, and water. The rest of the components were fed over a 2.5 hour period after the exotherm was established. Samples were withdrawn at 0.5 hour intervals. Pressure was kept constant by further addition of VF. Initially, vinyl fluoride was added to a pressure of 250 p.s.i. in the reactor. Ethylene was then pressured into a total of 400 p.s.i. The temperature was then raised in the jacket to about 80° C. The vinyl fluoride was then changed in again to a total pressure of 850 p.s.i. The temperature was then raised to 85° C. with stirring, and the feeds started at a rate to maintain a 5–10° C. exotherm. Total additions were VAc (1300 gms.), MAA (33 gms.), $H_2O$ (2180 gms.), "Triton" X–305 (47 gms.), "Aerosol" A–102 (40 gms.), WP–09 (25.4 gms.), "Elvanol" 52–22 (6.4 gms.), $NaHCO_3$ (6.2 gms.), ammonium persulfate (10 gms.), $NaHSO_3$ (3 gms.) and Hercules 340 F. defoamer (trace).

The reactor was kept at about 85° C. for 4 hours at 850 p.s.i. pressure of VF; the pressure rising at intervals to 925 p.s.i. An emulsion of the tetrapolymer was obtained, of 37% solids, containing 1280 gms. polymer. Conversion was 59% based on VAc. After bleed-off the excess VF and most of the excess VAc, 5% free VAc was found remaining in the emulsion by bromine titration of a sample. The free VAc and some water was removed by evaporation in a rotary evaporator. The final dispersion of about 50% solids had good shelf, thermal (oven at 125° F.), and mechanical stability (Waring Blendor). The inherent viscosity of the isolated polymer was 1.1 (0.5% in dimethyl formamide) with only 1% gel. The isolated polymer had excellent flexibility and toughness (an air-dried film extracted of $H_2O$ solubles had a tensile strength of 1800 p.s.i. and ultimate elongation of 42%).

The glass transition temperature of the polymer was low ($T_g = 13°$ C.) and accounts for the good coalescence of the polymer from aqueous dispersion at room temperature. The heat sealing temperature of the pressed, dried film was 92° C. (50% relative humidity) and had an instantaneous Shore (A) hardness of 79 at 25° C. and 55 at 50° C., which shows good maintenance of hardness at elevated temperatures (an acrylic copolymer film from Rohm & Haas, "Rhoplex" AC–35 emulsion, had a Shore hardness of 79 at 25° C. but only 35 at 50° C.). Brittle temperature (by crease test) was as low as −78° C., and impact strength (for film pressed on 25 mil thick aluminum panels, reverse bump) was greater than 72 inch-lbs.

The polymer dispersion was iminated in a fashion similar to that described in Example 27, except that the dispersion temperature was 70° C. A paint was then made, again in similar fashion to Example 27 but in this case the pigment volume concentration (PVC) of the experimental paint and the controls was made to 40%. Component weights were as follows:

| Grind: | Lbs. |
|---|---|
| H₂O | 101.2 |
| "Tamol" 731 | 10.1 |
| KTPP | 1.0 |
| Propylene glycol | 25.4 |
| "Colloid" 581 B antifoam | 2.0 |
| "Ti-Pure" R 960-TiO₂ | 174.7 |
| "Snowflake" Whiting | 242.8 |
| "Cellosize" WP4400 (3%) | 49.7 |
| Mica 325 Mesh H₂O ground | 30.5 |
| "Metasol" 57 (PMP) bulk | 1.8 |
| Reduction: | |
| "Cellosize" WP–4400 (3%) | 64.6 |
| H₂O | 8.2 |
| VF/VAc/E/MAA dispersion | 488.4 |
| Total weight | 1200.4 |

One need in a high weatherable paint is the ability to be applied over old, chalky painted substrates.

Southern yellow pine panels were painted with a linseed oil alkyd paint and exposed until chalking heavily. The VF tetrapolymer paint was then applied (one-coat), as were also 3 controls, all recommended for outside house paints. In Table X the first entry is a commercial acrylic emulsion formulated with the same components as our experimental paint; the second entry is an acrylic emulsion formulated for durable outside house paints using the formulation recommended by the manufacturer; the third entry is a vinyl acetate/ethylene/methacrylic acid terpolymer emulsion; and the fourth entry is a commercial acrylic tint base paint of lower pigment volume concentration (PVC).

As noted in Table X (18 months exposure) and Table XI (24 months exposure), the 34/60/5/1 VF/VAc/E/MAA tetrapolymer shows an outstanding spectrum of properties, particularly in crack resistance after 18 months and especially after 24 months outdoor exposure.

EXAMPLE 31

27/66/6/1.5% tetrapolymer VF/VAc/E/MAA prepared in a batch manner and made into a paint similarly to Example 30 was also applied over chalky oil base paint coating, and weathered as shown in Table X. Again a greatly improved performance over the control is seen.

TABLE X

Substrate: Southern yellow pine panels painted with linseed oil alkyd paint and exposed until chalking heavily
Primer: none
Location: Florida
Exposure time (months): 18
Orientation: 45° S

| Composition | Chalk | Mildew | Crack | Flake |
|---|---|---|---|---|
| Acrylic emulsion ("Rhoplex" AC-35 from Rohm & Haas) formulated like Example 30 (PVC 40) | 10 | 6 | 5 | 5 |
| "Rhoplex" AC-35, formulated as recommended by manufacturer (PVC 40) | 5 | 6 | 3 | 7 |
| VAc/E/MAA (86.2/12/1.8%) iminated terpolymer (PVC 40) | 10 | 5 | 9 | 9 |
| Commercial paint ["Lucite" #52 (G) from du Pont] (Green tint) (PVC 30) | 8 | 5 | 6 | 8 |
| (30) VF/VAc/E/MAA (34/60/5/1 percent) plus EI (batch) (PVC 40) | 10 | 7 | 9 | 9 |
| (31) VF/VAc/E/MAA (27/66/6/1.5 percent) plus EI (batch) iminated at 70° C. (PVC 40) | 10 | 6 | 9 | 9 |

TABLE XI

Substrate: Southern yellow pine panels painted with linseed oil alkyd paint and exposed until chalking heavily
Primer: None
Location: Florida
Exposure time (months): 24
Orientation: 45° S

| Composition | Chalk | Fade | Mildew | Crack | Flake |
|---|---|---|---|---|---|
| VAc/E/MAA (86,2/12/1,8) | 10 | 8 | 5 | 5 | |
| (30) VF/VAc/E/MAA (34/60/5/1) | 9 | 7 | 7 | 7 | 8 |
| (31) VF/VAc/E/MAA (27/66/6/1.5) | 9 | 9 | 6.5 | 7 | 8 |

As noted above, the polymers of this invention are prepared by polymerization of a mixture of the monomers in the presence of a free radical-initiating system, carried out in bulk, in relatively inert organic solvents, or in aqueous media. A list of representative examples is given in Table VIII. Note the use of additives to control molecular weight (butyraldehyde, Example 20), and various recipes in the aqueous systems to produce either coagulum, granular products, or aqueous dispersions. A continuous aqueous process is particularly advantageous due to the ease of producing stable dispersions or finely divided beads, and also because of the high productivity possible. Thus, note in Example 23; to a 300 cc. stirred, stainless steel reactor with about 5 minutes hold-up time are added the monomers at 850 p.s.i., 100–103° C. to produce one pound per hour of solid polymer as a 42% aqueous dispersion, inherent viscosity 1.0, with 64% overall conversion, and over 92% of the vinyl acetate converted to polymer.

The MAA content shown in Table VIII ranges from 1.9 to 6.8%. The lower limit of 0.1 would lead to poorer emulsion stability, lower wet adhesion, lower film hardness, increased dirt pickup, and poorer print resistance. Higher MAA contents were examined, but weatherability, corrosion resistance and water resistance fell off appreciably.

The lower limit of VF content of about 10% would be demonstrated by reduced weatherability (cracking, gloss retention, chalk resistance). The upper limit of VF content of 59% (for low VF interpolymers) is also shown for pigmented compositions by a decrease in gloss retention on aging, and a decrease in coalescibility on air-drying from emulsion. Thus, remarkably, the pigmented terpolymers with the lower VF content actually show greater retention of gloss than those with higher VF content levels.

The inherent viscosity varied from 0.2 to about 2.5 deciliters/gm. (a 0.25% solution in dimethyl formamide at 25° C.). Probably higher viscosities would also be satisfactory, but are not easily attained.

Higher vinyl esters which can be substituted for vinyl acetate, are vinyl stearate, vinyl 2-ethyl hexoate (the vinyl esters of the straight chain or singly branched aliphatic carboxylic acids), the vinyl esters of saturated tertiary carboxylic acids of 5 carbon atoms (vinyl neopentanoate, i.e., vinyl pivalate), of 9 carbon atoms (vinyl ester of "Versatic 9" acid, available from the Shell Chemical Company), and of 10 carbon atoms (vinyl ester of "Versatic 10" acid, from the Shell Chemical Company), and the vinyl esters of aromatic carboxylic acids (vinyl benzoate).

Other monomers may be incorporated in fairly small amounts from about 10 up to about 22% of the total composition, as noted above. That is ethylene, esters of acrylic acid, methacrylic acid, vinyl chloride, and vinyl ethers of lower aliphatic alcohols (8 carbon atoms or less) and the like.

The resulting polymers may be used clear, but the incorporation of pigments is definitely recommended, particularly in uses at low-to-moderate temperatures. Also, curing agents such as epoxy compounds; formaldehyde donors such as dimethyl ethylene urea, trimethylol melamine, and dimethylol urea; metal oxides, salts or chelates, and the like, may also be added to reduce water sensitivity or creep after air-drying or baking.

Many different free-radical initiators may be employed in making the new compositions including, peroxides, azo compounds, inorganic per-compounds, radiation, redox systems such as persulfate-bisufite and the like. Also, the polymerization may be carried out in two stages rather than one. For example, a VF/VAc/E/MAA tetrapolymer can be prepared by reacting VAc/E/MAA in a first stage, followed by VF/VAc/MAA in a second stage, to obtain products of excellent appearance and weatherability. The process may be carried out at pressures as low as 500 p.s.i. although higher pressures are generally preferred up to 4000 p.s.i. and even up to 10,000 p.s.i. The polymerization may be carried to high conversion rather than to the low conversion shown in certain of the examples, and still obtain products of excellent weatherability. The paint products may contain the usual fillers such as titanium dioxide, calcium carbonate, mica, and the like.

In preparing paints from the aqueous dispersions of the interpolymers of the invention, a wide latitude in formulation is possible. The resulting paints are very stain resistant, so basic lead silicate filler is not necessary in formulations for use on red cedar. Also, these paints do not tend to become brittle at reduced temperatures after weathering as do acrylic-based paints, so higher levels of pigment, up to 47.5% pigment volume content can be tolerated. Coalescing aids like Cellosolve acetate or "Texanol" can be used to aid coalescence during the early stages of the application and exposure. Other additives such as mildewcides, etc., known to those skilled in the art can be added as usual. The imination step described in certain of the foregoing examples does seem to improve to some extent the wet adhesion, and resistance to cracking on soft substrates. The polymers have good alkali resistance, and so are better than vinyl acrylics or other vinyl acetate copolymer based systems on asbestos/cement shingles, in resistance to "burning" or efflorescence.

The novel terpolymers of greatest utility in the present invention, as contrasted to those disclosed in Straughan U.S. Pat. 3,057,812 referred to above, have a second order transition temperature below about 40° C. and preferably, below about 30° C.

The novel terpolymers of the invention, as contrasted to the compositions of the prior art containing vinyl fluoride polymers can be applied to a wide variety of substrates either as solutions in a variety of conventional solvents, such as methyl ethyl ketone, or as dispersions in water or in non-aqueous solvents such as hexane (in organosol form). It has also been found that the new polymers not only retain the desirable properties of vinyl fluoride polymers as surface coatings, but also unexpectedly permit the incorporation of large amounts of conventional pigments without serious loss of stability of the resulting surface coatings as would be expected from the prior art. It is apparent, therefore, that the new polyvinyl fluoride polymer compositions containing vinyl esters and polymerizable unsaturated carboxylic acid monomers, in the proportions recited above, with or without added internal plasticizers, attain the objects of the invention as recited above.

While the invention has been described above in connection with certain specific embodiments thereof, it will be obvious to those skilled in the art that it is susceptible of wide variation and is to be limited only by the appended claims construed in the light of the prior art.

I claim:

1. An interpolymer consisting of, in polymerized form:
   (a) about 10 to about 83% of vinyl fluoride;
   (b) about 17 to about 90% of a vinyl ester of a saturated aliphatic carboxylic acid containing 2 to 18 carbon atoms;
   (c) about 0 to about 22% of a monomer selected from the group consisting of ethylene, higher vinyl esters and acrylate esters;
   (d) about 0.1 to about 12% of a polymerizable, olefinically unsaturated acid having an acidity constant (pKa) of from about 1 to about 5.5;
wherein the total content of (a) and (b) is at least about 78%; said interpolymer having an inherent viscosity of at least about 0.2 in a 0.25% solution in dimethyl formamide at 25° C., said percentages being by weight of the total composition.

2. An interpolymer of claim 1, wherein (d) is selected from the group consisting of (A) ethylenically unsaturated mono- and di-carboxylic acids having from 3–11 carbon atoms, (B) the anhydrides, half esters, and salts of said unsaturated dicarboxylic acids and (C) ethylenically unsaturated phosphonic acids, both free and partially esterified, and the salts and anhydrides of said acids.

3. An interpolymer of claim 2 wherein (b) is vinyl acetate.

4. An interpolymer of claim 3 wherein (d) is selected from the group consisting of methacrylic acid, acrylic acid and itaconic acid.

5. An interpolymer of claim 3 wherein (d) is methacrylic acid.

6. An interpolymer of claim 1 wherein the content of (a) is about 10 to about 59% and the content of (b) is about 30 to about 90%.

7. An interpolymer of claim 6 wherein (d) is selected from the group consisting of (A) ethylenically unsaturated mono- and di-carboxylic acids having from 3–11 carbon atoms, (B) the anhydrides, half esters, and salts of said unsaturated dicarboxylic acids and (C) ethylenically unsaturated phosphonic acids, both free and partially esterified, and the salts and anhydrides of said acids.

8. An interpolymer of claim 7 wherein (b) is vinyl acetate.

9. An interpolymer of claim 8 wherein (d) is selected from the group consisting of methacrylic acid, acrylic acid and itaconic acid.

10. An interpolymer of claim 8 wherein (d) is methacrylic acid.

11. An interpolymer of claim 10 wherein (c) is 2-ethylhexyl acrylate.

12. An interpolymer of claim 10 wherein (c) is ethylene.

13. An interpolymer of claim 1 wherein the amount of (a) is about 60 to about 83% and the content of (b) is about 17 to about 40%.

14. An interpolymer of claim 13 wherein (d) is selected from the group consisting of (A) ethylenically unsaturated mono- and di-carboxylic acids having from 3–11 carbon atoms, (B) the anhydrides, half esters, and salts of said unsaturated dicarboxylic acids and (C) ethylenically unsaturated phosphonic acids, both free and partially esterified, and the salts and anhydrides of said acids.

15. An interpolymer of claim 14 wherein (b) is vinyl acetate.

16. An interpolymer of claim 15 wherein (d) is selected from the group consisting of methacrylic acid, acrylic acid and itaconic acid.

17. An interpolymer of claim 15 wherein (d) is methacrylic acid.

18. A coating composition comprising an interpolymer of claim 1 in solution in a solvent selected from the group comprising methyl ethyl ketone, dimethyl formamide, tetrahydrofuran ethyl acetate, or mixtures thereof.

19. A method for protecting the surface of a shaped article which comprises applying to said surface a coating composition comprising an interpolymer of claim 1 in a vehicle and heating the resulting coating at an elevated temperature up to about 125° C. to drive off said vehicle and coalesce said interpolymer into an adherent protective film on said surface.

20. An article having an adherent surface coating thereon comprising an interpolymer of claim 1.

21. A process for the manufacture of an interpolymer of claim 1 which comprises reacting a monomer mixture consisting essentially of (a), (b), (c) and (d) in an aqueous system at a pressure in the range from about 500 p.s.i. up to about 10,000 p.s.i., in the presence of a free-radical initiating material.

References Cited
UNITED STATES PATENTS

| | | | |
|---|---|---|---|
| 3,531,441 | 9/1970 | Stilmar | 260—78.5 |
| 2,917,402 | 12/1959 | Sapper | 117—33.3 |
| 3,451,978 | 6/1969 | Chalmers et al. | 260—78.5 |
| 3,057,812 | 10/1962 | Straughan et al. | 260—29.6 |
| 3,318,850 | 5/1967 | Stilmar | 260—78.5 |

JOSEPH L. SCHOFER, Primary Examiner

J. KIGHT III, Assistant Examiner

U.S. Cl. X.R.

260—78.5 CL, 78.5 R, 80.6, 80.71, 80.8, 80.81, 87.1, 97.5